US010509558B2

United States Patent
Chen et al.

(10) Patent No.: US 10,509,558 B2
(45) Date of Patent: Dec. 17, 2019

(54) SYSTEM AND METHOD FOR ENABLING ADVERTISEMENT INTERACTION WITH AN ELECTRONIC DEVICE

(71) Applicant: SPOTIFY AB, Stockholm (SE)

(72) Inventors: Edward Chen, New York City, NY (US); Simon Cohen, New York City, NY (US); Carl Horned, New York City, NY (US)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/836,270

(22) Filed: Dec. 8, 2017

(65) Prior Publication Data

US 2019/0179506 A1  Jun. 13, 2019

(51) Int. Cl.
G06F 3/048 (2013.01)
G06F 3/0488 (2013.01)
G06Q 30/02 (2012.01)
H04L 29/06 (2006.01)
G06F 3/0481 (2013.01)

(52) U.S. Cl.
CPC ........ *G06F 3/0488* (2013.01); *G06F 3/04817* (2013.01); *G06Q 30/0267* (2013.01); *G06Q 30/0277* (2013.01); *H04L 65/1059* (2013.01); *H04L 65/1089* (2013.01); *H04L 65/4084* (2013.01); *H04L 65/4092* (2013.01); *H04L 65/60* (2013.01)

(58) Field of Classification Search
CPC .............. G06F 3/0481; G06Q 30/0257; G06Q 30/0277
See application file for complete search history.

(56) References Cited

U.S. PATENT DOCUMENTS

| | | | | |
|---|---|---|---|---|
| 2011/0288913 A1* | 11/2011 | Waylonis | ............... | G06Q 30/02 715/764 |
| 2013/0339850 A1* | 12/2013 | Hardi | ...................... | G06F 3/016 715/702 |
| 2016/0189223 A1* | 6/2016 | McLeod | ............ | G06Q 30/0257 705/14.55 |
| 2018/0011686 A1* | 1/2018 | Zhao | ...................... | G06F 1/163 |

* cited by examiner

*Primary Examiner* — Haoshian Shih
(74) *Attorney, Agent, or Firm* — Tucker Ellis LLP

(57) ABSTRACT

In accordance with an embodiment, described herein is a system and method for enabling advertisement interaction with an electronic device, for use in a digital media content environment. A media device includes a touch-sensitive display screen, and user interface that enables access to a stored media application. During the streaming of media content from a media server, an audio advertisement or other type of advertisement can be inserted into a stream, for playback at the media device. Using playback controls provided either by the user interface, or by a headphones, headset, or other type of device, a user can interact with the advertisement (even if the user interface is locked), by performing a defined gesture, which, if received at the media application during a defined time period associated with the advertisement, is interpreted as a signal to select or otherwise interact with the advertisement.

17 Claims, 14 Drawing Sheets

SYSTEM AND METHOD FOR ENABLING ADVERTISEMENT INTERACTION WITH AN ELECTRONIC DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to digital media content environments, and user interfaces for electronic devices, and are particularly related to a system and method for enabling advertisement interaction with an electronic device.

BACKGROUND

Electronic devices such as, for example, laptop computers, tablets, smartphones, smart watches, or other mobile devices, can be used as media devices for playing music, video, or other forms of media content provided by a digital media content environment.

Such media devices are often equipped with a touch-sensitive display screen and user interface that enables access to a stored media application, for example a music player app, using a variety of playback controls, such as one or more track selection or volume controls, and can be temporarily locked to avoid unintentional operation of the device.

However, media device platforms generally do not support user input directly to a stored media application while the device's user interface is locked, instead requiring the user to unlock the user interface before interacting with the application. In digital media content environments that periodically include audio advertisements or other type of advertisements as part of their streaming of media content, requiring a user to unlock the device's user interface, and then open a particular application, to interact with a streamed advertisement, is undesirable and generally results in low uptake of that advertisement.

SUMMARY

In accordance with an embodiment, described herein is a system and method for enabling advertisement interaction with an electronic device, for use in a digital media content environment. A media device includes a touch-sensitive display screen, and user interface that enables access to a stored media application. During the streaming of media content from a media server, an audio advertisement or other type of advertisement can be inserted into a stream, for playback at the media device. Using playback controls provided either by the user interface, or by a headphones, headset, or other type of device, a user can interact with the advertisement (even if the user interface is locked), by performing a defined gesture, which, if received at the media application during a defined time period associated with the advertisement, is interpreted as a signal to select or otherwise interact with the advertisement.

DETAILED DESCRIPTION

As described above, media device platforms generally do not support user input directly to a stored media application while the device's user interface is locked, instead requiring the user to unlock the user interface before interacting with the application. However, in digital media content environments that periodically include audio advertisements or other type of advertisements as part of their streaming of media content, requiring a user to unlock the device's user interface, and then open a particular application, to interact with a streamed advertisement, is undesirable and generally results in low uptake of that advertisement.

In accordance with an embodiment, described herein is a system and method for enabling advertisement interaction with an electronic device, for use in a digital media content environment. A media device includes a touch-sensitive display screen, and user interface that enables access to a stored media application. During the streaming of media content from a media server, an audio advertisement or other type of advertisement can be inserted into a stream, for playback at the media device. Using playback controls provided either by the user interface, or by a headphones, headset, or other type of device, a user can interact with the advertisement (even if the user interface is locked), by performing a defined gesture, which, if received at the media application during a defined time period associated with the advertisement, is interpreted as a signal to select or otherwise interact with the advertisement.

Digital Media Content Environments

Figure 1:
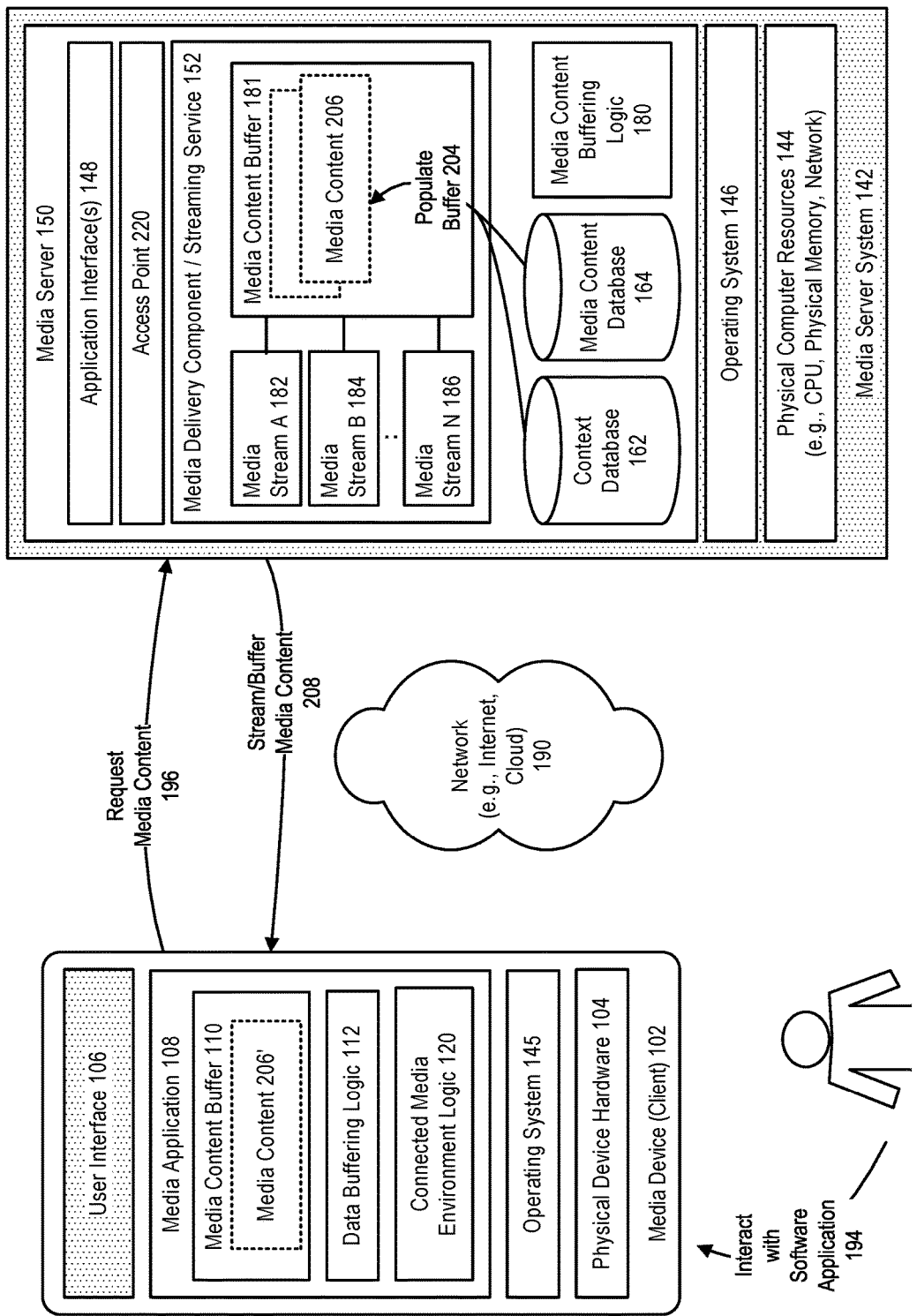
FIG. 1 illustrates an example digital media content environment, in accordance with an embodiment.

FIG. 1 illustrates an example digital media content environment, in accordance with an embodiment.

As illustrated in FIG. 1, in accordance with an embodiment, a media device 102, operating as a client device, can receive and play media content provided by a media server system 142 (media server), or by another system or peer device. In accordance with an embodiment, the media device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the media device and the media server can include, respectively, one or more physical device or computer hardware resources 104, 144, such as one or more processors (CPU), physical memory, network components, or other types of hardware resources; and an operating system 145, 146 or other processing environment.

Although, for purposes of illustration, a single client media device and media server are shown, in accordance with an embodiment a media server can support the simultaneous use of a plurality of client media devices. Similarly, in accordance with an embodiment, a client media device can access media content provided by a plurality of media servers, or switch between different media streams produced by one or more media servers.

In accordance with an embodiment, the media device can optionally include a touch-enabled or other type of display screen having a user interface 106, which is adapted to display media options, for example as an array of media tiles, thumbnails, or other format, and to determine a user interaction or input. Selecting a particular media option, for example a particular media tile or thumbnail, can be used as a command by a user and/or the media device, to the media server, to download, stream or otherwise access a corresponding particular media content item or stream of media content.

In accordance with an embodiment, the media device can also include a software media application 108, together with an in-memory client-side media content buffer 110, and a client-side data buffering logic or software component 112, which can be provided as software or program code that is executable by a computer system or other processing device, and which can be used to control the playback of media content received from the media server, for playing either at a requesting media device (i.e., controlling device) or at a controlled media device (i.e., controlled device), in the manner of a remote control.

In accordance with an embodiment, a connected media environment logic or software component 120, which can be provided as software or program code that is executable by a computer system or other processing device, can be provided at the media device, either as part of the media application, or separately, for example as a firmware, to enable the media device to participate within a connected media environment (e.g., a Spotify Connect environment) that enables a user to control the playback of media content at such controlled devices.

In accordance with an embodiment, the client-side data buffering logic, together with the media content buffer, enables a portion of media content items, or samples thereof, to be pre-buffered at a client media device. For example, while media options are being prepared for display on a user interface, e.g., as media tiles or thumbnails, their related media content can be pre-buffered at the same time, and cached by one or more media devices in their media content buffers, for prompt and efficient playback when required.

In accordance with an embodiment, the media server can include an operating system or other processing environment which supports execution of a media server 150 that can be used, for example, to stream music, video, or other forms of media content to a client media device, or to a controlled device.

In accordance with an embodiment, the media server can provide a subscription-based media streaming service, for which a client media device or user can have an associated account and credentials, and which enable the user's media device to communicate with and receive content from the media server. A received media-access request from a client media device can include information such as, for example, a network address, which identifies a destination media device to which the media server should stream or otherwise provide media content, in response to processing the media-access request.

For example, a user may own several media devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling device, and their audio speaker as a controlled device to which media content should be sent. The media server can then send the requested media and/or forward the media-access request to the audio speaker, even though the request originated at the user's smartphone.

In accordance with an embodiment, one or more application interface(s) 148 can receive requests from client media devices, or from other systems, to retrieve media content from the media server. A context database 162 can store data associated with the presentation of media content by a client media device, including, for example, a current position within a media stream that is being presented by the media device, or a playlist associated with the media stream, or one or more previously-indicated user playback preferences. The media server can transmit context information associated with a media stream to a media device that is presenting that stream, so that the context information can be used by the device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination media device to which the media content is being streamed changes, say from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client media devices to search within repositories of media content, to locate particular media content items.

In accordance with an embodiment, a server-side media content buffering logic or software component 180, which can be provided as software or program code that is executable by a computer system or other processing device, can be used to retrieve or otherwise access media content items, in response to requests from client media devices or other systems, and to populate a server-side media content buffer 181, at a media delivery component or streaming service 152, which can be similarly provided as software or program code that is executable by a computer system or other processing device, with streams 182, 184, 186 of corresponding media content data, which can then be returned to the requesting device or to a controlled device.

In accordance with an embodiment, a plurality of client media devices, media server systems, and/or controlled devices, can communicate with one another using a network, for example the Internet 190, a local area network, peer-to-peer connection, wireless or cellular network, or other form of network. For example, a user 192 can interact 194 with the user interface at a client media device, and issue requests to access media content, for example the playing of a selected music or video item at their device, or at a controlled device, or the streaming of a media channel or video stream to their device, or to a controlled device.

In accordance with an embodiment, the user's selection of a particular media option can be communicated 196 to the media server, via the server's application interface. The media server can populate its server-side media content buffer at the server 204, with corresponding media content, 206 including one or more streams of media content data, and can then communicate 208 the selected media content to the user's media device, or to a controlled device as appropriate, where it can be buffered in a client-side media content buffer for playing at the device.

In accordance with an embodiment, and as further described below, the system can include a server-side media gateway or access point 220, provided as software or program code that is executable by a computer system or other processing device, or other process or component, which operates as a load balancer in providing access to one or more servers, for use in processing requests at those servers. The system can enable communication between a client media device and a server, via an access point at the server, and optionally the use of one or more routers, to allow requests from the client media device to be processed either at that server and/or at other servers.

For example, in a Spotify media content environment, Spotify clients operating on media devices can connect to various Spotify back-end processes via a Spotify "accesspoint", which forwards client requests to other servers, such as sending one or more metadataproxy requests to one of several metadataproxy machines, on behalf of the client or end user.

Audio Advertisements

In digital media content environments that periodically play audio advertisements as part of their streaming of media content, the media server and/or an advertisement server can cause an audio advertisement or other type of advertisement to be inserted into a stream, for playback at the media device.

Figure 2:
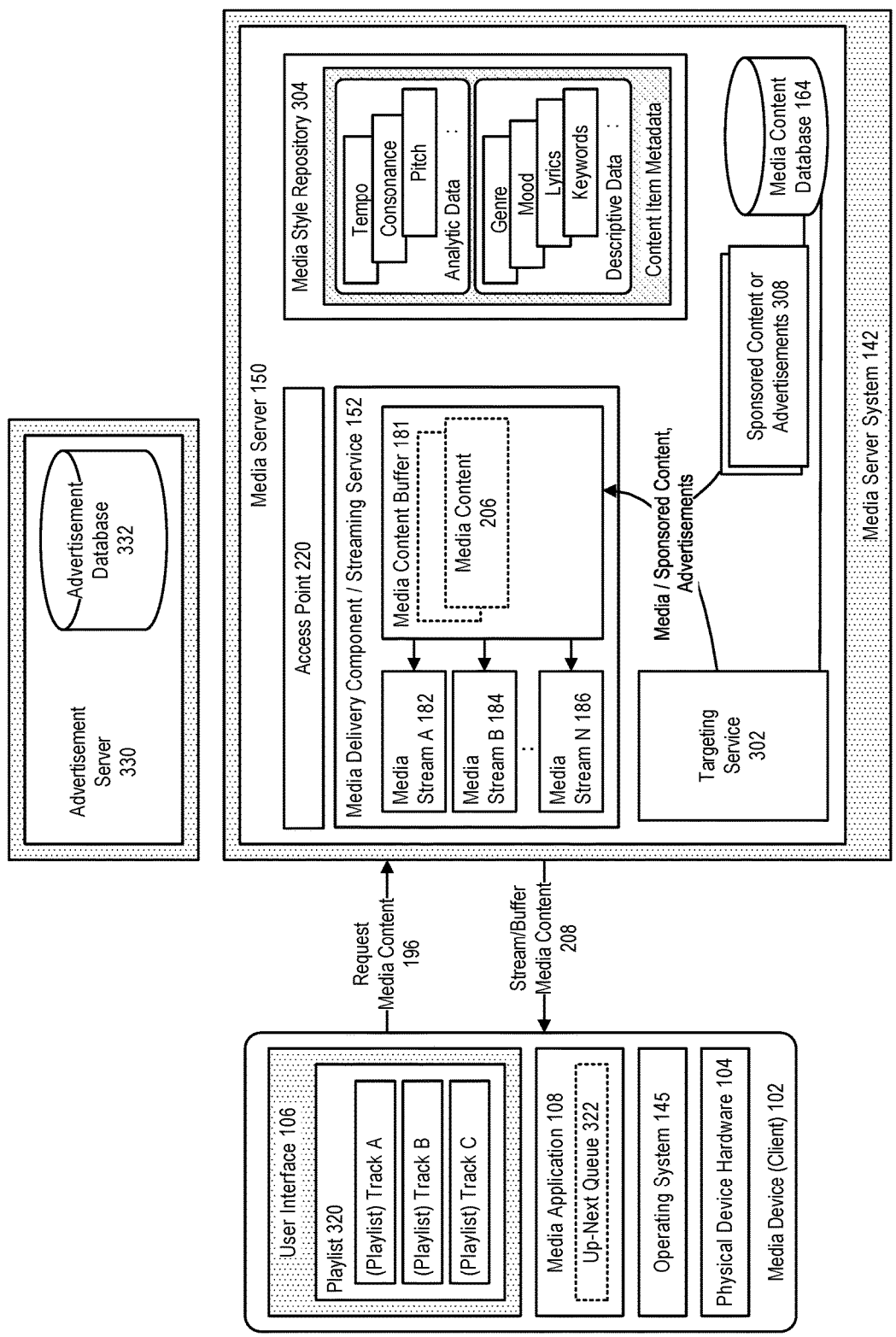
FIG. 2 illustrates an example use of a digital media content environment to provide advertisements, in accordance with an embodiment.

FIG. 2 illustrates an example use of a digital media content environment to provide advertisements, in accordance with an embodiment.

As illustrated in FIG. 2, in accordance with an embodiment, a user can interact with a media device or client, and issue requests to access media content at a media server, for example, to stream music, video, or other forms of media content to the media device. In response, the media server can populate a media content buffer with corresponding items of media or sponsor-directed content, for example as one or more streams of media content and/or advertisement or other sponsor-directed content, and communicate the selected media content to the user's media device.

In accordance with an embodiment, a targeting service 302 can be used to determine an appropriate sponsored content or advertisement, which can be combined or otherwise associated with a particular stream or session of media content playback.

For example, in accordance with an embodiment, the media server can include a media style repository 304 that stores media content item metadata associated with different items of media content, for use in providing music-styled and/or contextual information about the media content. The media delivery component/streaming service, in combination with the targeting service, can determine an appropriate media content, and/or sponsored content or advertisement 308, for streaming within a particular session, for example as a playlist 320 having a plurality of tracks.

In accordance with an embodiment, the media application can operate with the media server to maintain a queue data structure, referred to herein in accordance with some embodiments as an up-next queue 322, which indicates one or more items of media content as determined by a current playlist, and/or by sponsored content or advertisements, that are scheduled to be played at the media device.

Alternatively and/or additionally, in accordance with an embodiment, an advertisement server 330, for example a DoubleClick for Publishers (DFP) advertisement server, together with an advertisement database 332, can be used in connection with the media server to help manage a content provider's advertising campaigns and satisfy orders from advertising partners.

Figure 3:
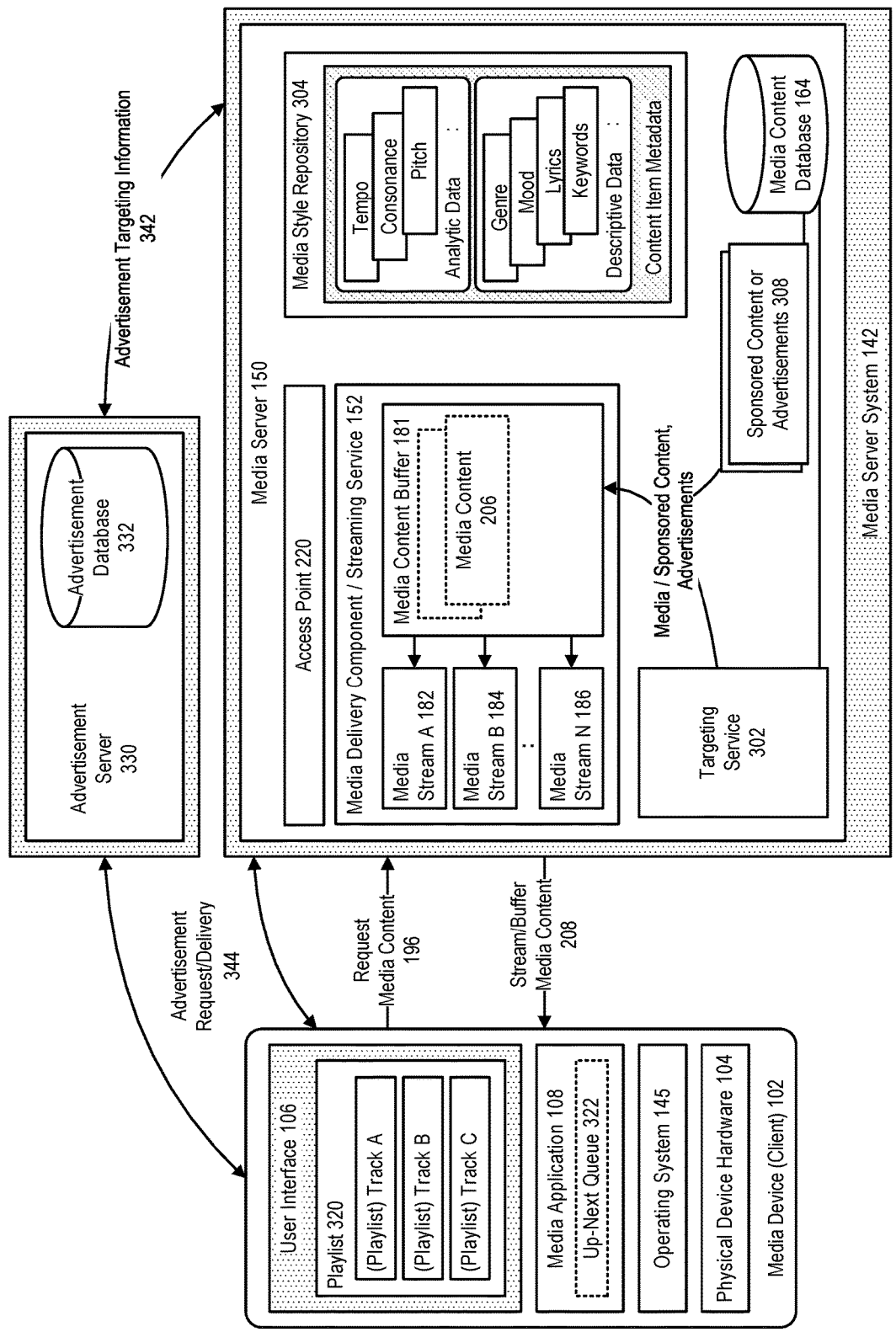
FIG. 3 further illustrates an example use of a digital media content environment to provide advertisements, in accordance with an embodiment.

FIG. 3 further illustrates an example use of a digital media content environment to provide advertisements, in accordance with an embodiment.

As illustrated in FIG. 3, in accordance with an embodiment, advertising targeting information 342 can be shared between the media server and the advertisement server, for use in determining an audio advertisement or other type of advertisement to be inserted into a stream, for playback at the media device.

For example, during the playing of media content associated with a playlist, an advertisement, as determined by the media server or advertisement server, can be inserted either into the playlist, and/or the up-next queue, for playback by the media application at the media device.

Alternatively, in accordance with an embodiment, an offering of one or more advertisements can be displayed on the user interface, for selection by a user.

In accordance with an embodiment, the media application at the client media device, can make a call 344, either to the advertisement server, or to the media server, requesting that an audio advertisement or other type of advertisement be directly provided by the advertisement server or media server, to the media device, for playback at the media device. In such environments, the advertisement server or media server can then make a determination as to which particular advertisement to deliver.

Alternatively, in accordance with an embodiment, a code/tag can be used to retrieve a particular audio advertisement or other type of advertisement either from the media server, or from the advertisement server.

For example, in accordance with an embodiment, the advertisement server can be used to determine which advertisement should be provided, and use redirection, in combination with a code/tag, to cause the client to retrieve the appropriate content from the media server, for example by providing the code/tag to the client, which the client can then use to request the corresponding content from the media server.

In such embodiments, the advertisement server can be responsible for selecting or determining an advertisement, with the media server being responsible for receiving the requests from the clients and delivering the advertisement to the media device.

The above examples are provided by way of illustration. In accordance with other embodiments, other methods of determining and providing advertisements can be used.

Advertisement Interaction and Selection

As described above, in digital media content environments that periodically include audio advertisements or other type of advertisements as part of their streaming of media content, requiring a user to unlock the device's user interface, and then open a particular application, to interact with a streamed advertisement, is undesirable and generally results in low uptake of that advertisement.

Additionally, with various different types of media device platforms available in the marketplace, there may be inconsistency in their approach to providing access to a third-party application, such as a media application. Depending on the media device platform, a user who may be listening to music, but not actively operating the media application, may be faced with various different procedures for interacting with an advertisement.

In accordance with an embodiment, the above issues can be addressed through the use of playback controls provided either by the user interface, or by a headphones, headset, or other type of device, to support defined gestures that allow interaction with an advertisement.

For example, in accordance with an embodiment, a user can interact with an audio advertisement or other type of advertisement (even if the user interface is locked), by performing a defined gesture, which, if received at the media application during a defined time period associated with the advertisement, is interpreted as a signal to select or otherwise interact with the advertisement.

Figure 4:
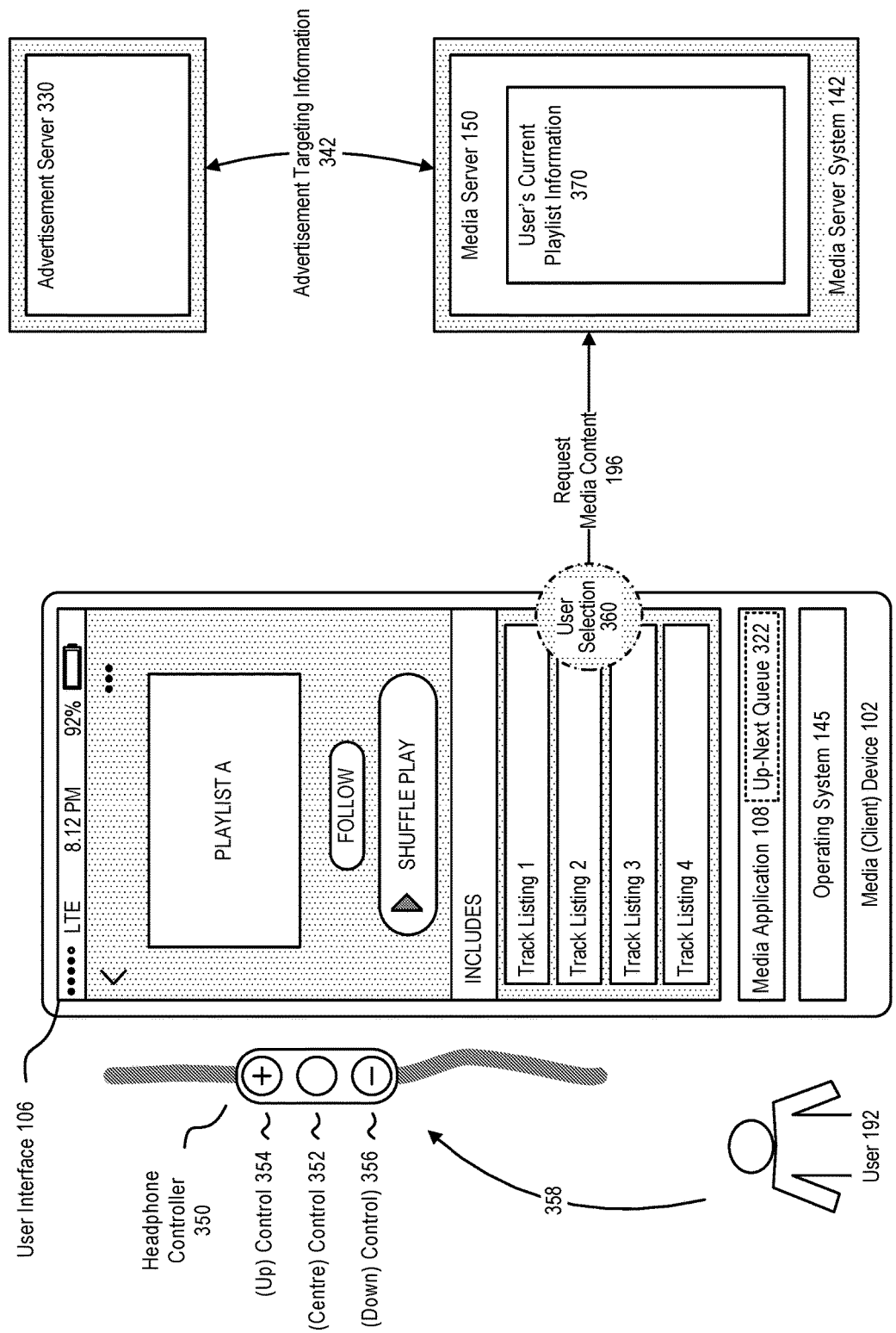
FIG. 4 illustrates an example usage of a media device with a stored media application, which enables interaction with advertisements, in accordance with an embodiment.

FIG. 4 illustrates an example usage of a media device with a stored media application, which enables interaction with advertisements, in accordance with an embodiment.

As illustrated in FIG. 4, in accordance with an embodiment, a media device can be used in combination with a headphones device 350, or other type of device that includes a plurality of playback controls, including in this example a (center) control 352, an (up, e.g., volume-up) control 354, and a (down, e.g., volume-down) control 356, and that is in wired or wireless communication with the media device.

For example, in accordance with an embodiment, a headphones, headset, or other type of device, together with its playback controls can be used to pause playback of a media content by tapping the center control; skip a media content by double-tapping the center control; or fast-forward a media content by double-tapping the center control and long-pressing the second tap, which gestures are communicated to the media device.

As referred to above, the volume-up and volume-down labels are provided by way of illustration, to reflect that in many situations these playback controls can be used to adjust upward or downwards the volume of a media content being played by the device. However, the functionality of the playback controls are not restricted to these operations, but rather, as further described below, can also be used to signal defined gestures, such as skip actions.

For example, as further described below, in accordance with an embodiment, the user can interact 358 with one or more of the center, up, or down controls at the headphones, headset, or other type of device, to make a user selection 360, such as a skip forward, which controls the playback of the current media option or selection of a current advertisement.

Figure 5:
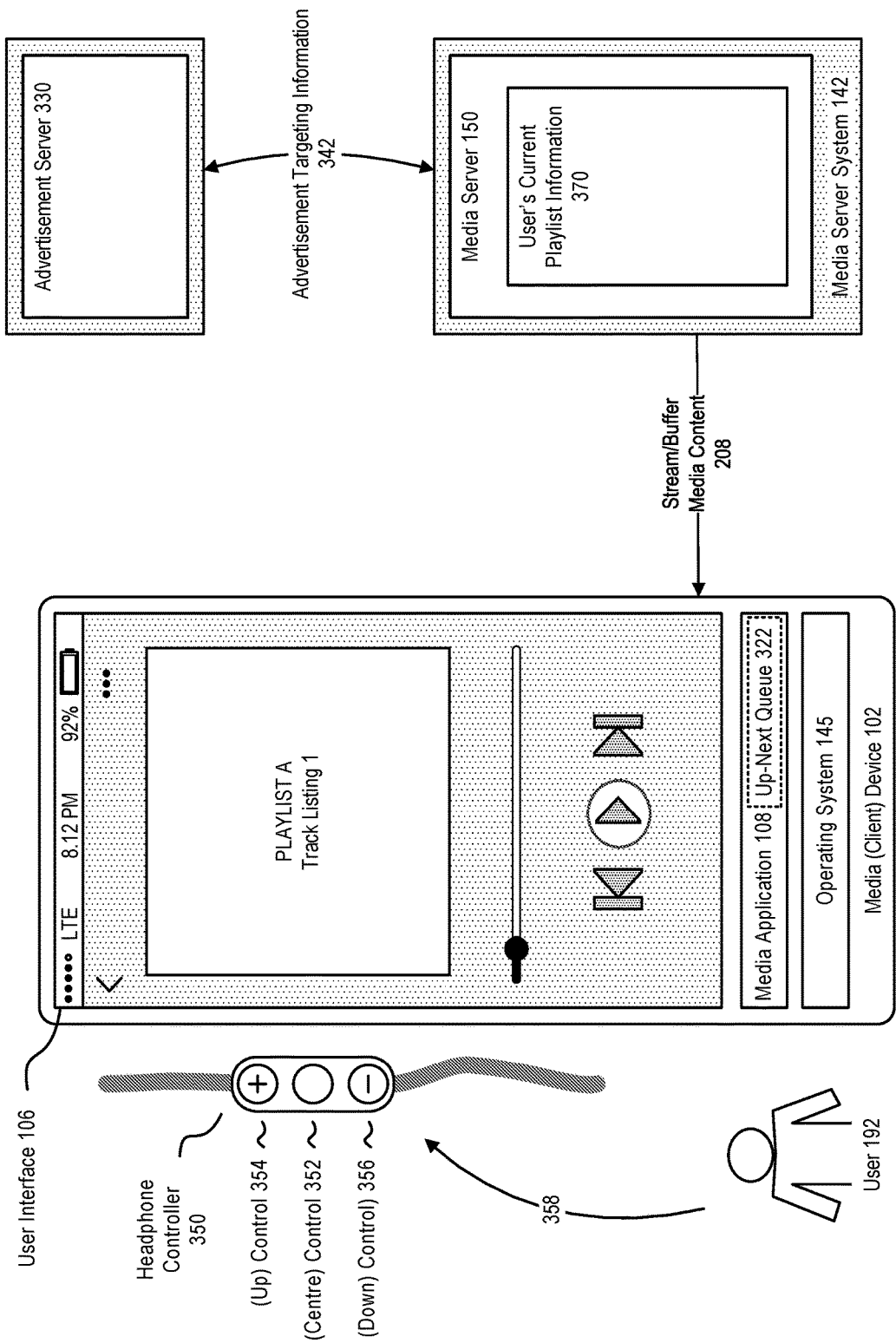
FIG. 5 further illustrates an example usage of a media device with a stored media application, in accordance with an embodiment.

FIG. 5 further illustrates an example usage of a media device with a stored media application, in accordance with an embodiment. As illustrated in FIG. 5, the user can select a playlist or track, in this example "Playlist A-Track Listing 1", which can be identified by the user's current playlist information 370, such as for example the playlist they are currently listening to, or a media content item in that playlist. The corresponding media content can then be returned by the media server to the media device, for playback by the media application.

Figure 6:
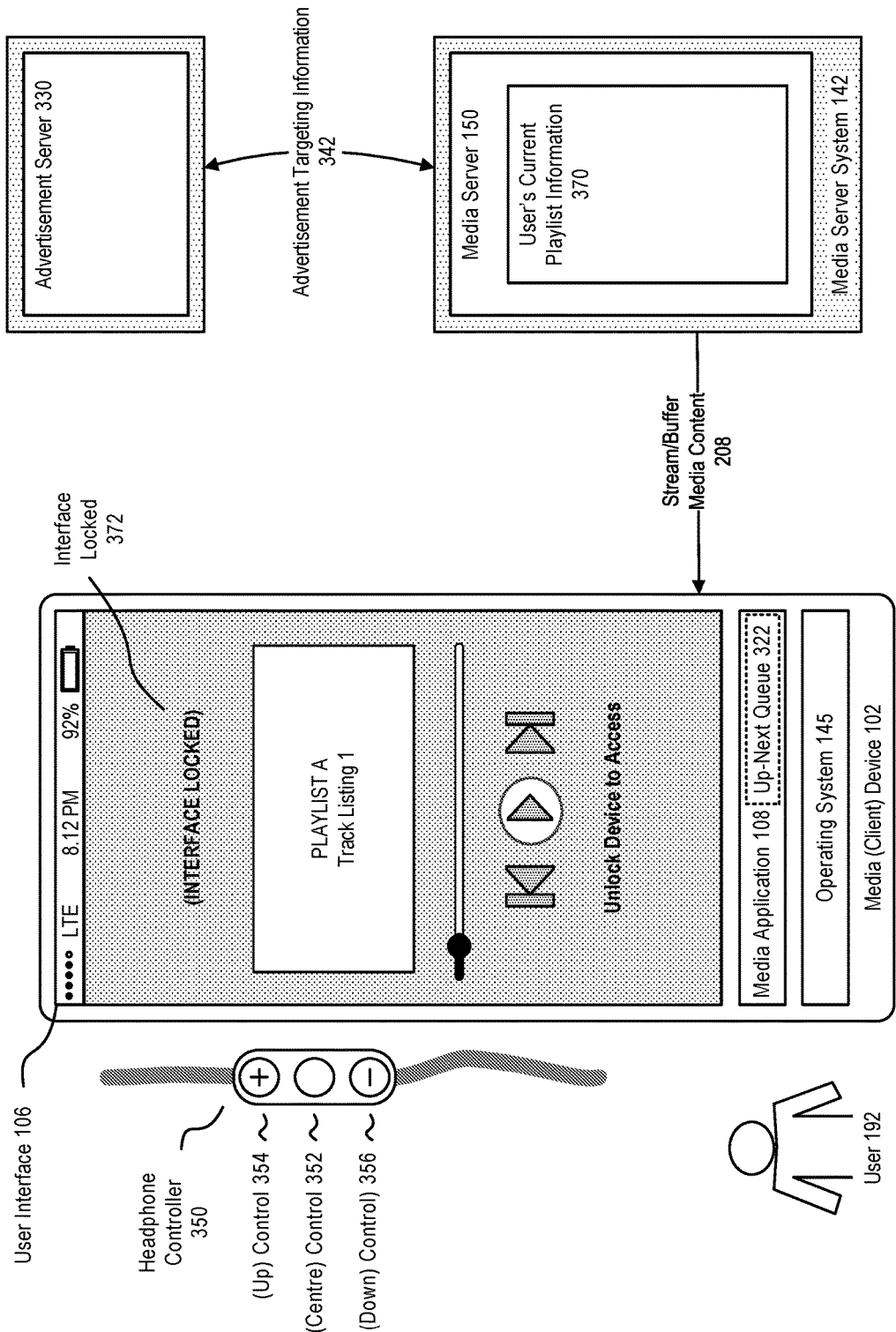
FIG. 6 further illustrates an example usage of a media device with a stored media application, in accordance with an embodiment.

FIG. 6 further illustrates an example usage of a media device with a stored media application, in accordance with an embodiment. As illustrated in FIG. 6, in this example the user interface is locked 372, reflecting a situation when the media application is either not playing music, or is playing music in the background although the user is not currently interacting with the application.

Figure 7:
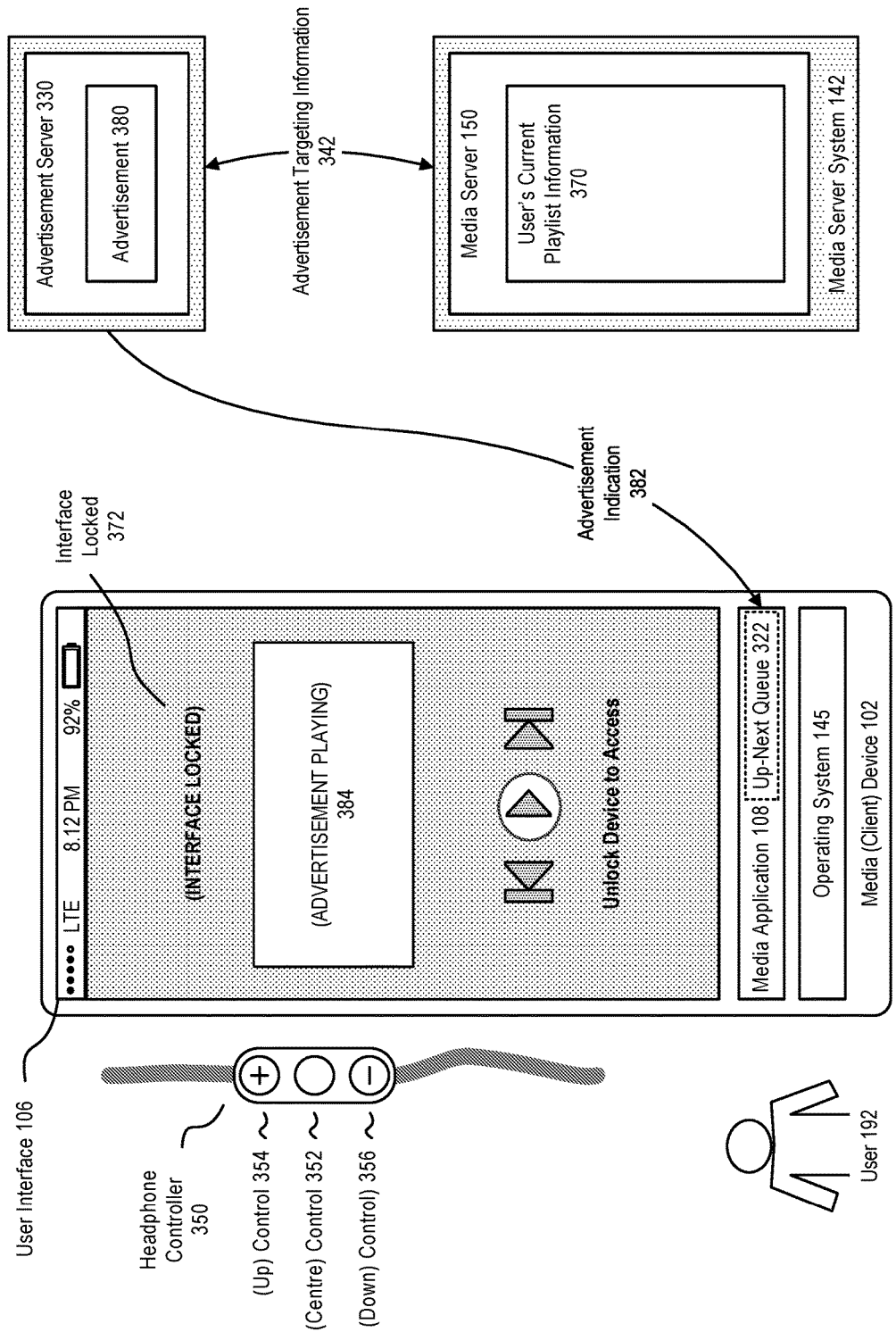
FIG. 7 further illustrates an example usage of a media device with a stored media application, in accordance with an embodiment.

FIG. 7 further illustrates an example usage of a media device with a stored media application, in accordance with an embodiment. As illustrated in FIG. 7, an advertisement 380 can be selected for playing, and an indication 382 of the advertisement communicated to the media application, for playing at the media device, using for example any of the methods described above for retrieving a sponsored content or advertisement from a media server and/or an advertisement server, including, in some instances the use of a code/tag.

Figure 8:
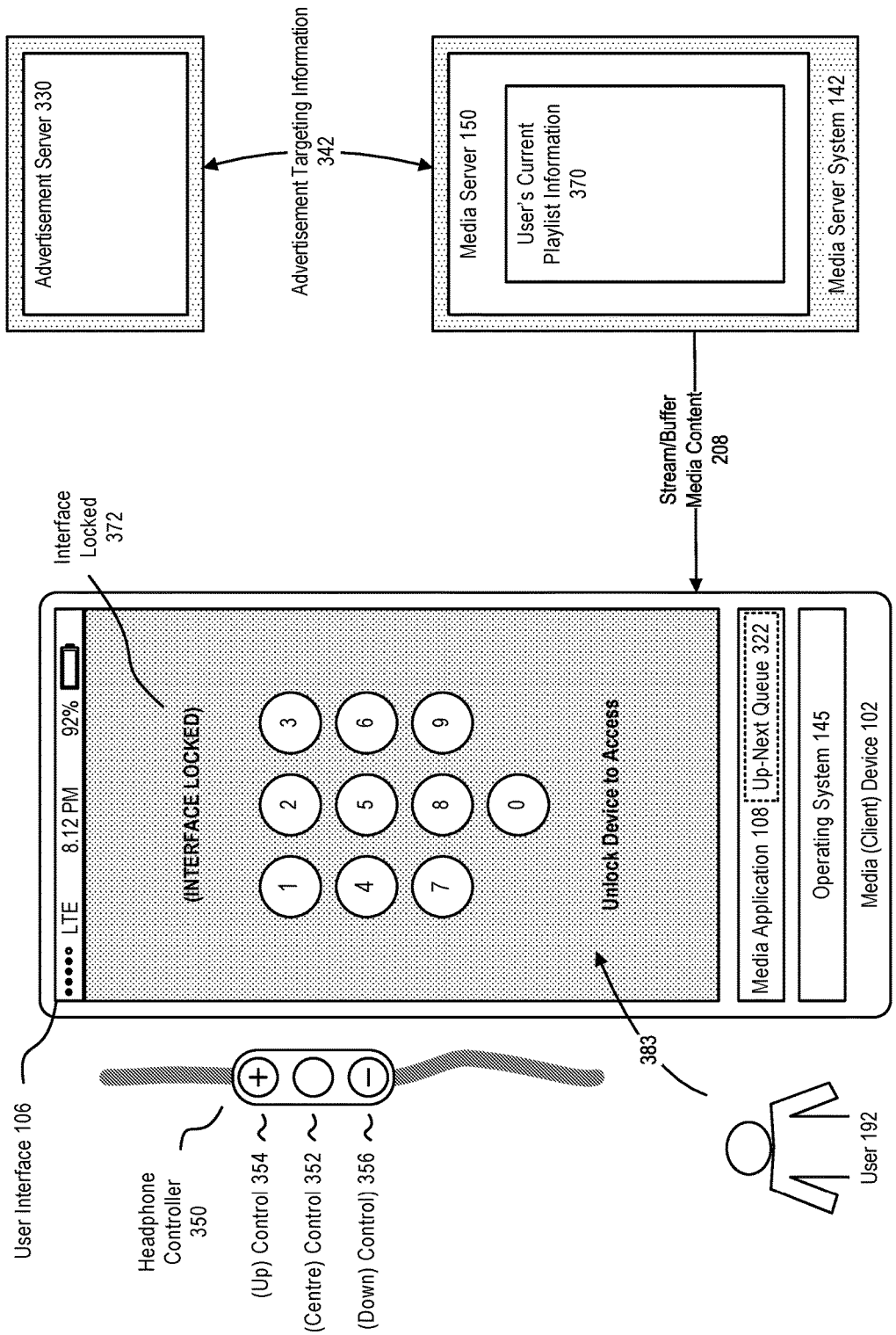
FIG. 8 further illustrates an example usage of a media device with a stored media application, in accordance with an embodiment.

FIG. 8 further illustrates an example usage of a media device with a stored media application, in accordance with an embodiment. As illustrated in FIG. 8, since the user interface is locked, in this example the user must unlock 383 the user interface, before interacting with the advertisement.

Figure 9:
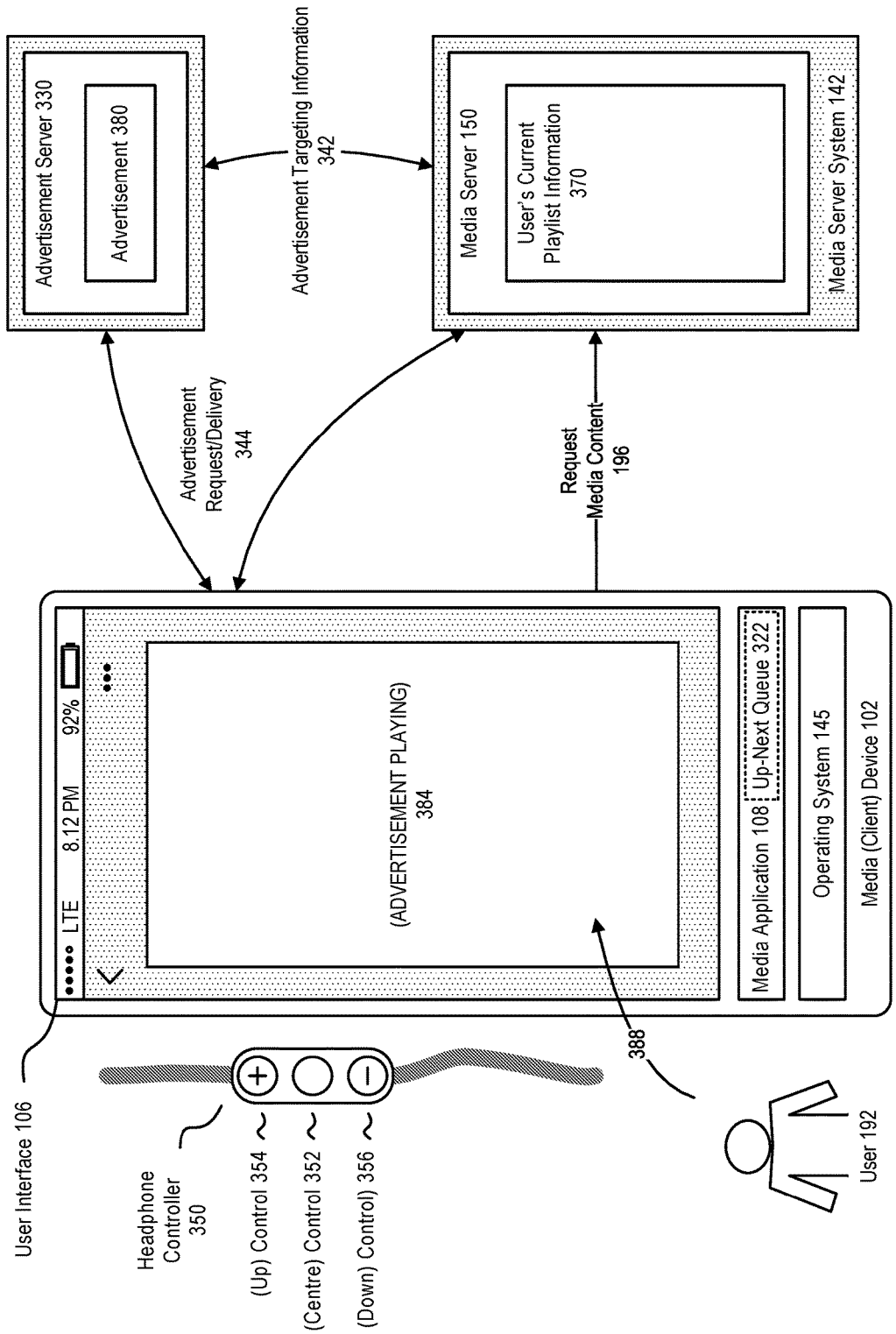
FIG. 9 further illustrates an example usage of a media device with a stored media application, in accordance with an embodiment.

FIG. 9 further illustrates an example usage of a media device with a stored media application, in accordance with an embodiment. As illustrated in FIG. 9, with the user interface unlocked and an audio advertisement or other type of advertisement playing 384, the user can interact with the advertisement 388. However, as described above, requiring a user to unlock the user interface, and then open a particular application, to interact with a streamed advertisement, is undesirable and generally results in low uptake of that advertisement.

Figure 10:
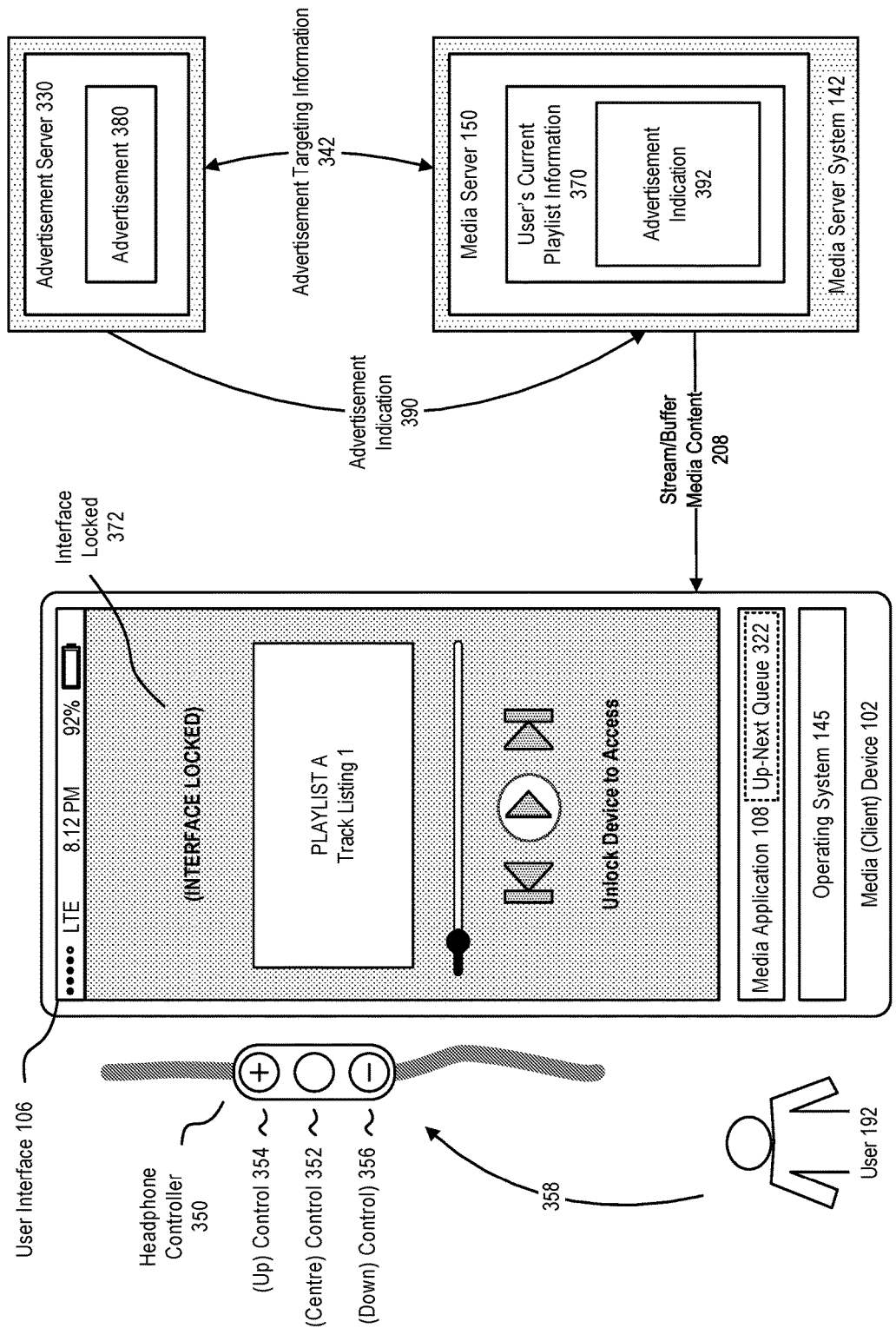
FIG. 10 further illustrates an example usage of a media device with a stored media application, in accordance with an embodiment.

FIG. 10 further illustrates an example usage of a media device with a stored media application, in accordance with an embodiment. As illustrated in FIG. 10, the user interface is again locked, similar to the example of FIG. 6 as shown above. In accordance with an embodiment, the advertisement indication 390 can be associated (392) with the users' current playlist information, and/or the up-next queue, to be played by the media application at the media device.

Figure 11:
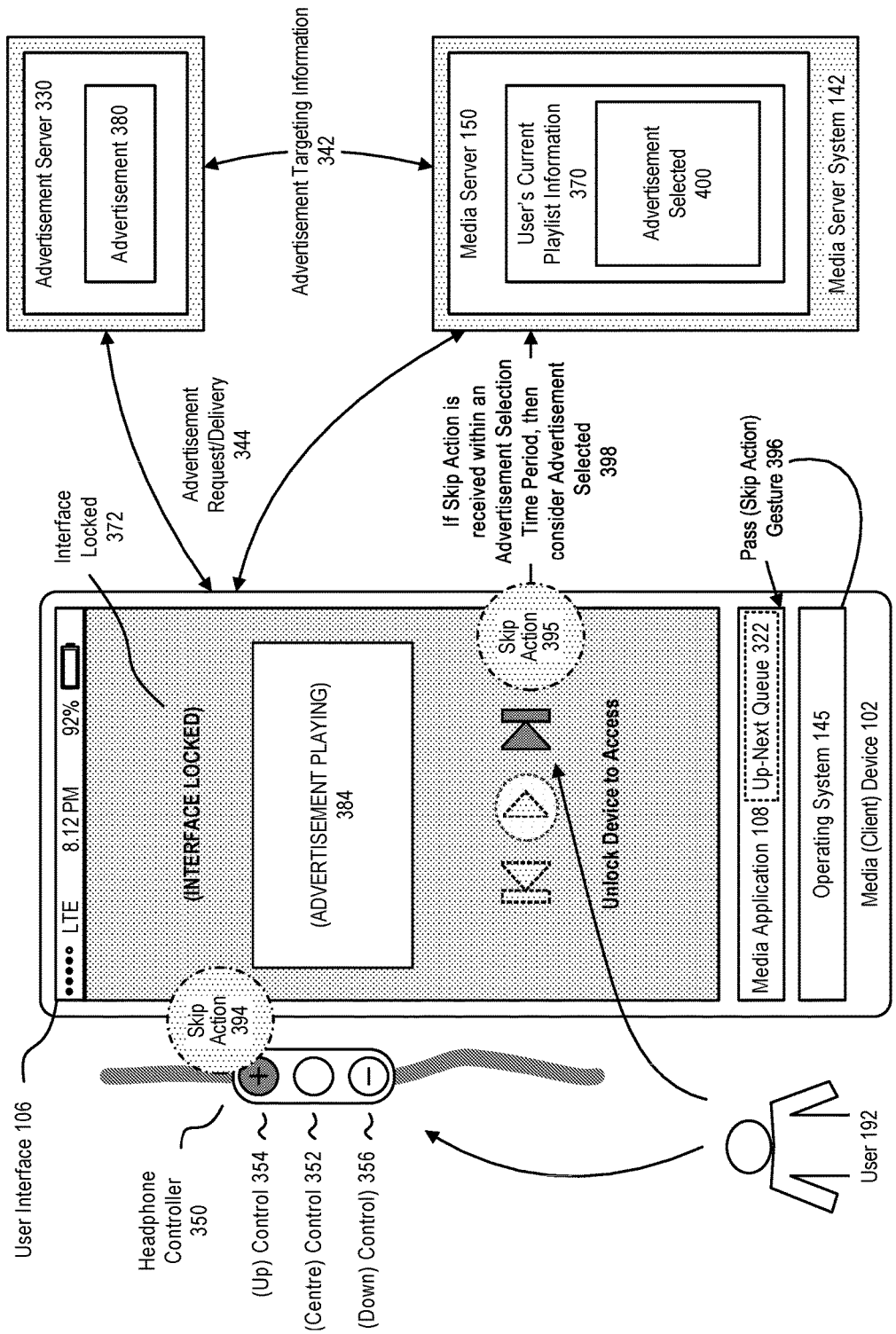
FIG. 11 further illustrates an example usage of a media device with a stored media application, in accordance with an embodiment.

FIG. 11 further illustrates an example usage of a media device with a stored media application, in accordance with an embodiment.

As illustrated in FIG. 11, in accordance with an embodiment, the media application is configured to recognize particular signals passed by the operating system, in response to a user interacting with a headphone device or other device that includes playback controls as described above.

In accordance with an embodiment, during the playing of media content associated with a playlist, an audio advertisement or other type of advertisement is inserted either into the playlist, and/or into a queue of scheduled media content, to be scheduled for playback by the media application at the media device.

During the playing of the advertisement, an indication of a defined gesture, such as skip action 394, 395 is received at the media device, via the operating system (396). A determination is made as to whether the indication of the defined gestures, e.g., skip action, was received within an advertisement selection time period associated with the currently playing advertisement. If the defined gesture, e.g., skip action, was received within the advertisement selection time period associated with the currently playing advertisement (398), then the advertisement is determined to have been selected (400).

For example, in accordance with an embodiment, an audio advertisement can prompt the user to perform a particular gesture, such as skipping to the next track during the playing of the advertisement, in order to select or otherwise interact with that advertisement. A user can make the defined gesture, such as for example using the headphone device playback controls to skip to the next track during the playing of the advertisement, which gesture is then communicated by the operating system to the media application.

In accordance with an embodiment, the media application can be configured to interpret a defined gesture e.g., skip action, receive within a particular time period as indicative of a selection of a currently playing advertisement (rather than, for example, a skip to a next media content item in a playlist). In this example, the skipping action is interpreted as something other than its regular skipping function (to advance a track of a playlist), and instead is treated as an interaction with the advertisement.

In accordance with an embodiment, the media application is configured to monitor for intercepts only during an advertisement selection time period that includes a 15 second time window during which the advertisement is being played.

For example, while playing a track, an audio advertisement can be played during a 15 second time window, perhaps with an audio prompt to the user that they can select the advertisement by skipping ahead to the next track. A skip action can be received at the device user interface or via a headset device or other device. If the skip action is received within the 15 second time window, then the communication received from the operating system is not treated as a (regular) request to advance a track, but is instead treated as a selection of the advertisement, which results in the functionality associated with that advertisement being performed, e.g., to provide access to a new playlist, send an email to the user, or some other functionality.

In accordance with an embodiment, if the skip action is not received within, in this example the 15 second time window, then the skip action results in its typical operation, e.g., to skip ahead to playing the next track in the current playlist.

Figure 12:
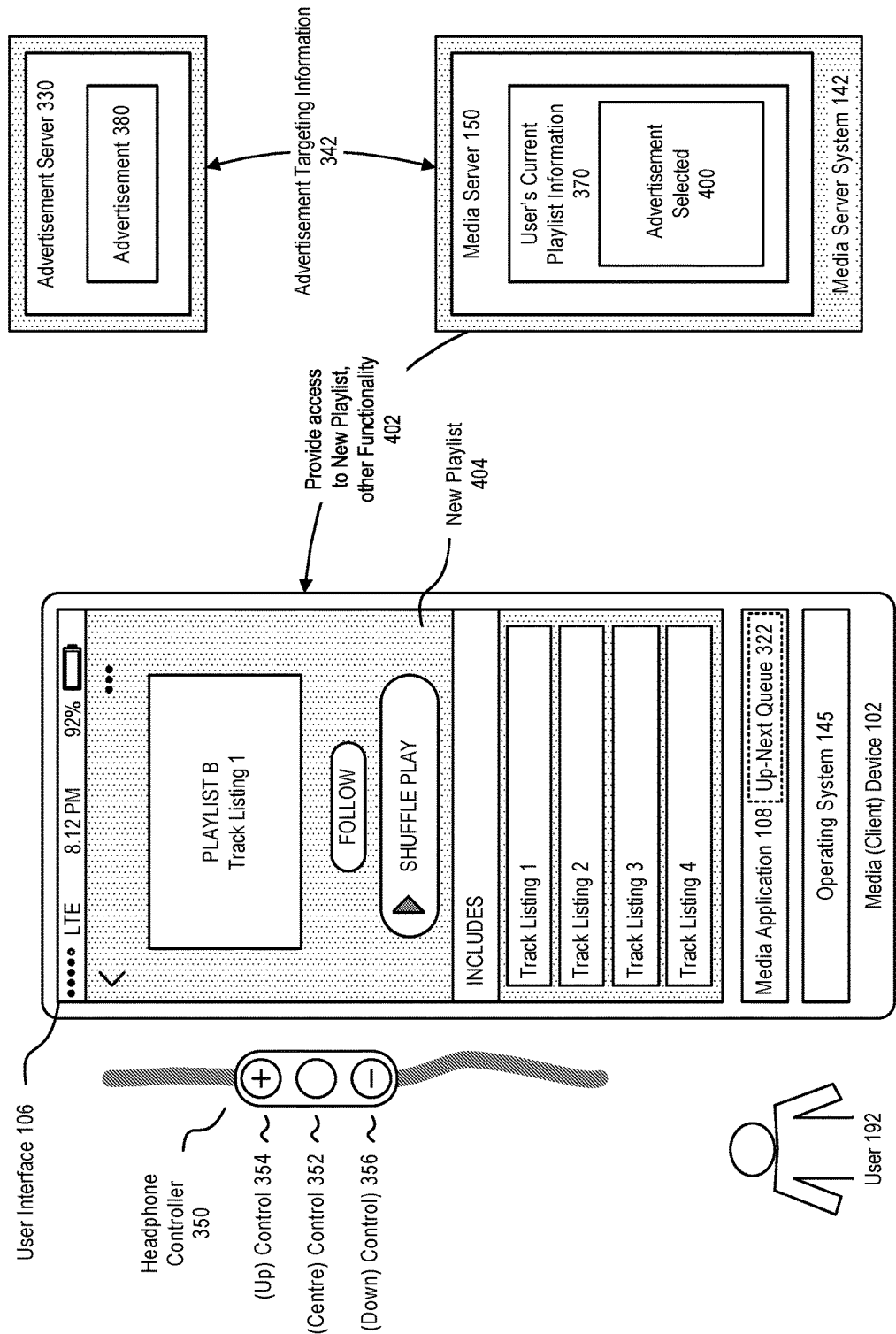
FIG. 12 further illustrates an example usage of a media device with a stored media application, in accordance with an embodiment.

FIG. 12 further illustrates an example usage of a media device with a stored media application, in accordance with an embodiment. As illustrated in FIG. 12, an example interaction can be to change a playlist, for example provide access to a new playlist, other functionality 402. The user can then interact with the new playlist 404.

For example, in a Spotify environment, a user may be listening to "Todays Top Hits", and receive an advertisement that offers the user to listen to "Rap Caviar" if they skip to the next track. If the user does skip to the next track, using either the user interface, or, for example, their Bluetooth headset, then "Rap Caviar" starts playing.

In accordance with an embodiment, the above-described approach works any time the user can hear the advertisement, i.e., whether their device's user interface is locked or not; and also works regardless of how the user chooses to skip, e.g., using the device's lock screen, or using a voice control, or using playback controls on their headphones, headset, or other type of device.

Figure 13:
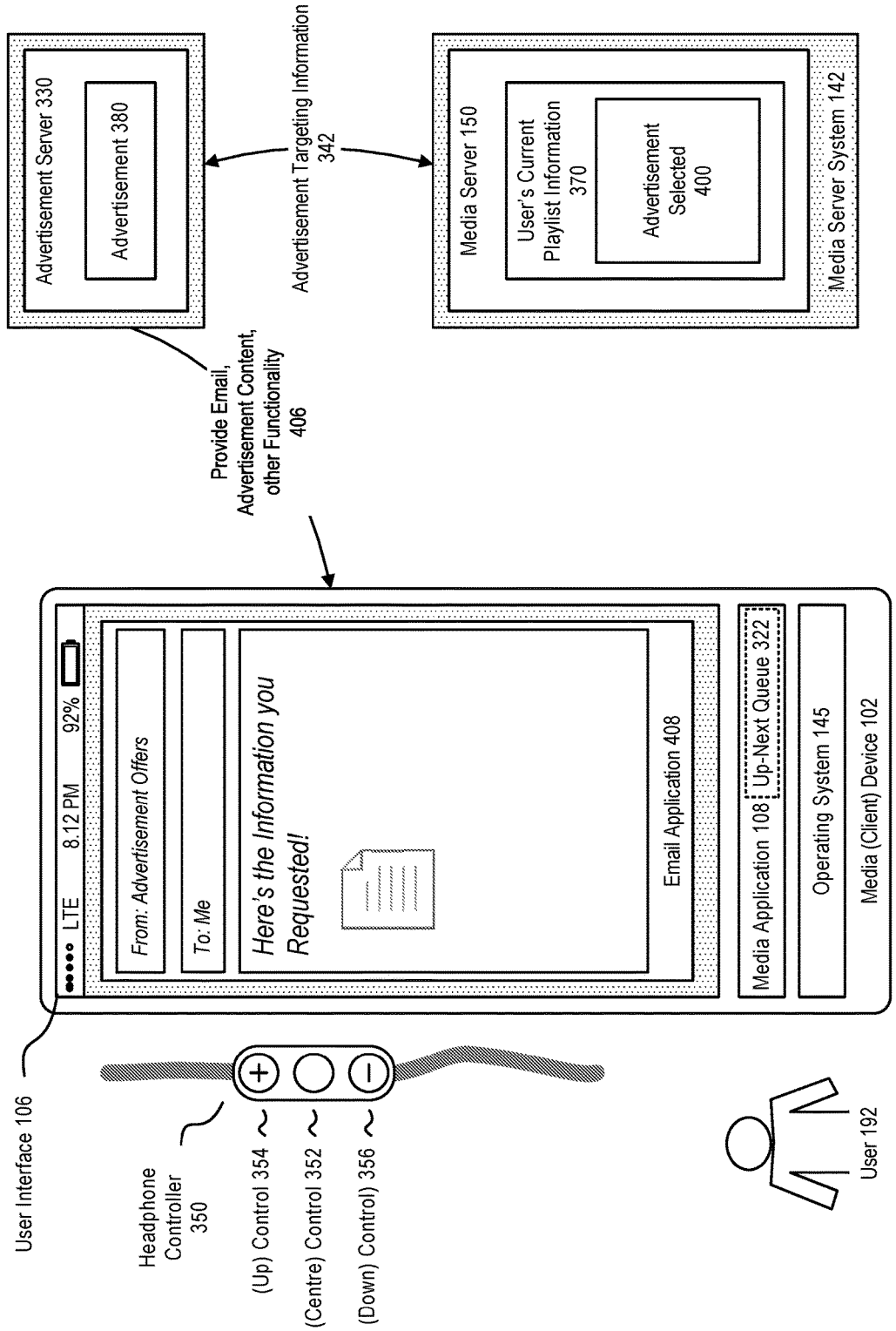
FIG. 13 further illustrates an example usage of a media device with a stored media application, in accordance with an embodiment.

FIG. 13 further illustrates an example usage of a media device with a stored media application, in accordance with an embodiment. As illustrated in FIG. 13, an example interaction can be to provide an email, advertisement content, other functionality 406, such as sending an email to the user's email application 408.

The above examples of interaction are provided by way of example, to illustrate how the user can interact with an advertisement without having to unlock their phones, including lock screen, voice, headphone controls or any other peripheral that has playback controls. In accordance with other embodiments, other types of controls can be used, for example smart speakers, and other types of gestures, examples of which are further described below Gesture Detection As described above, in accordance with an embodiment, using the playback controls provided either by the locked user interface, or by a headphones, headset, or other type of device, a user can interact with an audio advertisement or other type of advertisement by performing a defined gesture, which if received during a defined time interval is recognized as a signal to interact with the advertisement.

In accordance with an embodiment, the media application can be configured to recognize particular operations of the playback controls as defined gestures, for example skip actions, which may or may not be different from the typical operation performed by those playback controls.

For example, in accordance with an embodiment, the operating system can register volume-up or volume-down commands, as performed at a headset device or another device. However, when passed to the media application, depending on its configuration he media application can recognize the playback controls as particular defined gestures, e.g., to skip ahead to a next track of a playlist, or as described above, to select or otherwise interact with a currently playing audio advertisement.

An example code listing is provided below, which illustrates how a headset devices the volume control can be used to determine a gesture, such as a skip action. For example, in a accordance with an embodiment, the media application can be configured to recognize a plurality of volume change states:

```
enum VolumeChangeState
{
    NONE,
    WAIT_FOR_UP,
    WAIT_FOR_DOWN,
    WAIT_FOR_CLEAR
}
```

In accordance with an embodiment, he media application can also be configured to recognize a plurality of volume change directions:

```
enum VolumeDirection
{
    NEITHER,
    UP,
    DOWN
}
```

In accordance with an embodiment, a plurality of time thresholds can be defined by which gestures will be recognized, e.g., a combo threshold within which a combination of controls must be applied in order to be recognized, or a clear threshold to help reduce unexpected responses:

```
SystemVolumeContentObserver.OnSystemVolumeChangeListener
{
    private long currentTime = 0;
    private long prevChangeTime = 0;
    private VolumeDirection direction = VolumeDirection.NEITHER;
    private VolumeChangeState state = VolumeChangeState.NONE;
    private final static long COMBO_THRESHOLD_MS = 1500L; // 500 ms
    private final static long CLEAR_THRESHOLD_MS = 2L * 1000L; // 1 second
    @Override
    public void onVolumeChanged(float volumeLevel, float prevVolumeLevel) {
        Log.e("VOL", "volume changed!");
        direction = determineDirection(volumeLevel, prevVolumeLevel);
        if ( direction == VolumeDirection.NEITHER )
            return;
        eval( );
    }
```

In accordance with an embodiment, the volume direction can be determined:

```
VolumeDirection determineDirection(float volumeLevel, float prevVolumeLevel)
{
    if ( volumeLevel < prevVolumeLevel )
        return VolumeDirection.DOWN;
    if ( volumeLevel > prevVolumeLevel )
        return VolumeDirection.UP;
```

In accordance with an embodiment, the process can also account for users potentially adjusting in this example, the actually playback volume, rather than trying to perform a defined gesture:

```
    /*if ( Math.abs(volumeLevel - prevVolumeLevel) < 0.00001 )
    {
        Log.e("VOL", "Same volume levels");
        // volumeLevel == prevVolumeLevel
        // a move from 0 to 0 implies user hit down again and again
        if ( Math.abs(volumeLevel) < 0.00001 )
            return VolumeDirection.DOWN;
        // a move from same volume to same volume and not at level 0 implies max volume
        return VolumeDirection.UP;
    }*/
    return VolumeDirection.NEITHER;
}
synchronized void eval( )
{
    Log.e("VOL", "eval: [state=" + state.toString( ) + "][direction=" + direction.toString( ) + "]");
    currentTime = System.currentTimeMillis( );
    switch ( state )
    {
        case NONE:
            handleNone( );
            break;
        case WAIT_FOR_CLEAR:
            handleWaitForClear( );
            break;
```

```
            case WAIT_FOR_UP:
                handleWaitForUp( );
                break;
            case WAIT_FOR_DOWN:
                handleWaitForDown( );
                break;
        }
        prevChangeTime = currentTime;
    }
    void handleNone( )
    {
        switch ( direction )
        {
            case UP:
                state = VolumeChangeState.WAIT_FOR_DOWN;
                break;
            case DOWN:
                state = VolumeChangeState.WAIT_FOR_UP;
                break;
            default:
                state = VolumeChangeState.WAIT_FOR_CLEAR;
                break;
        }
    }
```

In accordance with an embodiment, a clear threshold helps reduce unexpected responses, by defining a period of time before we evaluate a volume change (such as for example associated with a skip action):

```
void handleWaitForClear( )
{
    Log.e("VOL", "handleWaitForClear");
    // we need to have no volume changes in some period of time before we can look
        for
    our combo again
        if ( currentTime - prevChangeTime < CLEAR_THRESHOLD_MS )
            return;
    Log.e("VOL", "handleWaitForClear will call none");
    // we've had no user volume activity for long enough, go back to none and re-eval
    state = VolumeChangeState.NONE;
    handleNone( );
}
```

In accordance with an embodiment, the process can then be used to recognize defined gestures:

```
void handleWaitForUp( )
{
    Log.e("VOL", "handleWaitForUp");
    // if we didnt get an up, then wait for clear
    if ( direction != VolumeDirection.UP )
    {
        state = VolumeChangeState.WAIT_FOR_CLEAR;
        return;
    }.
    Log.e("VOL", "did get an up");
    // check if combo timeout elapsed
    if ( currentTime - prevChangeTime >= COMBO_THRESHOLD_MS )
    {
        // combo timeout elapsed, wait for clear
        state = VolumeChangeState.WAIT_FOR_CLEAR;
        return;
    }
    Log.e("VOL", "skipping backwards");
    // we got an UP -and- it's within the combo timeout: we got combo!
    //mPlayerActions.skipNTracksBackwards(SpotifyService.this, 1);
    mPlayerManager.playPrevious(false);
    //prevChangeTime = prevDownTime = prevUpTime = 0;
    state = VolumeChangeState.NONE;
}
void handleWaitForDown( )
{
```

```
Log.e("VOL", "handleWaitForDown");
// if we didnt get a down, then wait for clear
if ( direction != VolumeDirection.DOWN )
{
    state = VolumeChangeState.WAIT_FOR_CLEAR;
    return;
}
Log.e("VOL", "got down");
// check if combo timeout elapsed
if ( currentTime - prevChangeTime >= COMBO_THRESHOLD_MS )
{
    // combo timeout elapsed, wait for clear
    state = VolumeChangeState.WAIT_FOR_CLEAR;
    return;
}
```

For example, In accordance with an embodiment, the process can recognize a defined gesture that can be associated with a skip action:

```
        Log.e("VOL", "skip forward");
        // we got a DOWN -and- it's within the combo timeout: we got combo!
            // mPlayerActions.skipNTracksForwards(SpotifyService.this, 1);
        mPlayerManager.playNext( );
        //prevChangeTime = prevDownTime = prevUpTime = 0;
        state = VolumeChangeState.NONE;
    }
}
```

As illustrated in the example code listing provided above, in accordance with an embodiment, defined gestures can be evaluated during a period of time, e.g., a skip action may involve a more complex gesture, e.g., volume-up followed by volume-down within a period of time. The gestures are then passed by the operating system to the media application, for action by the media application as described above, e.g., to select or otherwise interact with an advertisement, or for some other purpose of the media application.

The above example is provided by way of example to illustrates how a device can be used to perform gestures that can then be interpreted by a media application as skip actions or other operations, in accordance with an embodiment. In accordance with other embodiments, different types of commands and combinations thereof can be supported, to address other types of use case or media platforms.

Advertisement Selection Process

Figure 14:
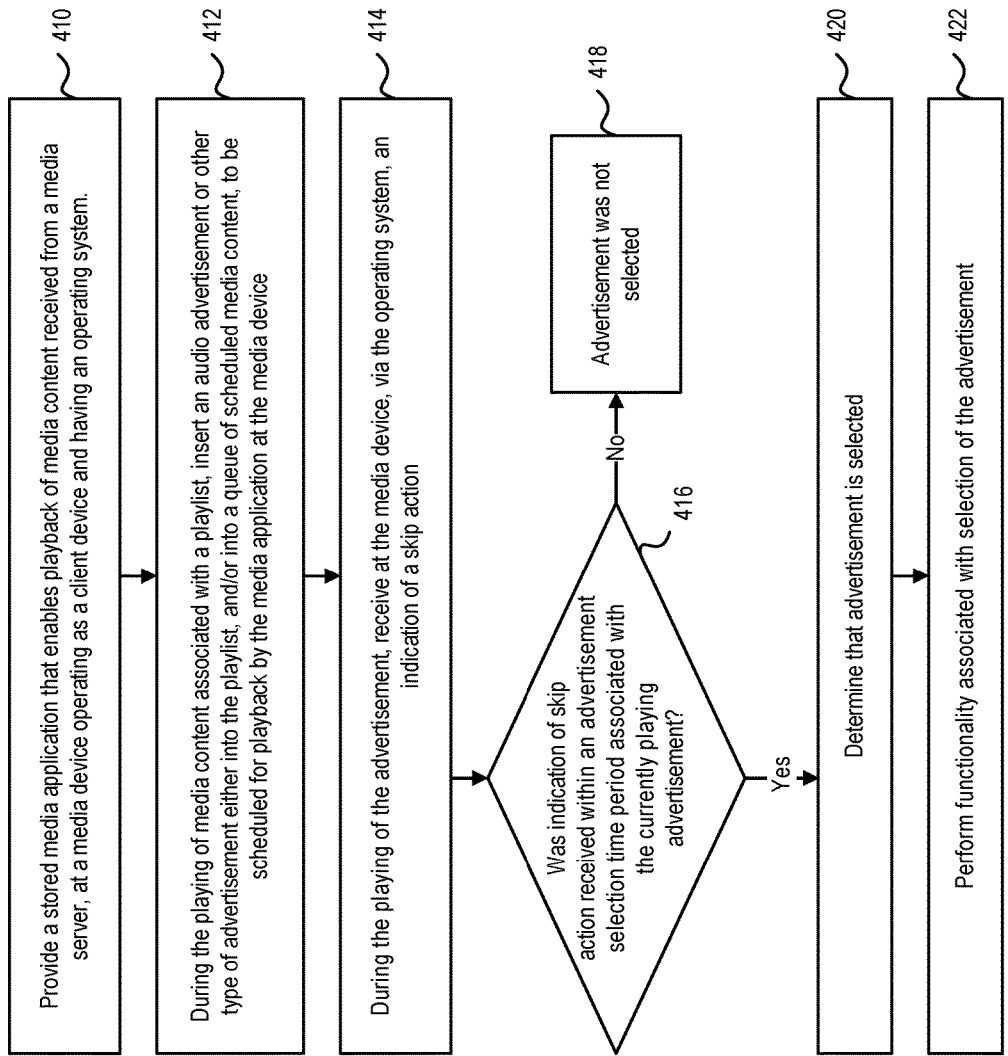
FIG. 14 illustrates a process for enabling interaction with advertisements, by a media device with a stored media application, in accordance with an embodiment.

FIG. 14 illustrates a process for enabling interaction with advertisements, by a media device with a stored media application, in accordance with an embodiment.

As illustrated in FIG. 14, at step 410, a stored media application that enables playback of media content received from a media server is provided at a media device operating as a client device and having an operating system.

At step 412, during the playing of media content associated with a playlist, an audio advertisement or other type of advertisement is inserted either into the playlist, and/or into a queue of scheduled media content, to be scheduled for playback by the media application at the media device.

At step 414, during the playing of the advertisement, an indication of a skip action is received at the media device, via the operating system.

At step 416, a determination is made as to whether the indication of a skip action was received within an advertisement selection time period associated with the currently playing advertisement.

If, at step 418, the indication of a skip action was not received within an advertisement selection time period associated with the currently playing advertisement, then the advertisement is determined to be not selected.

Alternatively, if step 420, the indication of a skip action was received within the advertisement selection time period associated with the currently playing advertisement, then the advertisement is determined to have been selected.

At step 422, a functionality associated with selection of the advertisement is performed. For example, as described above, in accordance with various embodiments such functionality can include, e.g., providing access to a new playlist, or sending an email to the user.

Embodiments can be conveniently implemented using one or more conventional general purpose or specialized digital computers, computing devices, machines, or microprocessors, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments has been provided for the purposes of illustration and description. It is not intended to be exhaustive or to limit the invention to the precise forms disclosed. Many modifications and variations will be apparent to the practitioner skilled in the art.

For example, while the techniques described above generally illustrate examples such as a music streaming service such as Spotify, and streamed music or song content, the systems and techniques described herein can be similarly used with other types of media content environments, and other types of streamed data or media content.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for enabling advertisement interaction with an electronic device, for use in a digital media content environment, comprising:
   a media device having a processor, operating system, user interface, and media application that enables playback of a stream of media content at the media device;
   wherein the media device operates with a headphones or headset device having playback controls for controlling playback of the stream of media content using the media device;
   wherein the media application is configured to:
      associate particular operations of one or more playback controls at the headphones or headset device with defined gestures, wherein each defined gesture is associated with a time threshold within which a combination of the playback controls must be applied in order for the gesture to be recognized,
      receive, from the operating system, during playing of an advertisement inserted into the stream for playback at the media device, an indication of an operation of the one or more playback controls at the headphones or headset device,
      determine whether the operation of the one or more playback controls at the headphones or headset device, as indicated by the operating system, is:
         (a) a particular defined gesture, as indicated by receipt of the one or more playback controls within the time threshold, and
         (b) received at the media application during a defined time period associated with the playing advertisement,
      if the operation of the one or more playback controls determined to be the particular defined gesture is received at the media application during the defined time period associated with the advertisement playing at the media device, then determining that the operation of the one or more playback controls is indicative of selection of the advertisement, and performing a first functionality associated therewith, and
      otherwise performing a regular functionality associated with the operation of the one or more playback controls.

2. The system of claim 1, wherein the particular defined gesture is a skip action, and the indication of the operation of the one or more playback controls at the headphones or headset device, and associated with the particular defined gesture, is passed by the operating system to the media application, for use by the media application in determining whether the particular defined gesture is received during the defined time period associated with the advertisement playing at the media device.

3. The system of claim 1, wherein the user interface is configured to be locked, and wherein the indication of the operation of the one or more playback controls at the headphones or headset device, and associated with the particular defined gesture, is communicated from the operating system to the media application while the user interface is locked.

4. The system of claim 1, whereupon determining that the operation of the one or more playback controls is indicative of selection of the advertisement, the media application causes an indication of a media content that is associated with the advertisement to be placed in a queue data structure at the media application, for playback at the media device.

5. A method of enabling advertisement interaction with an electronic device, for use in a digital media content environment, comprising:
   providing, at a media device having a processor, operating system, and user interface, a media application that enables playback of a stream of media content at the media device;
   wherein the media device operates with a headphones or headset device having playback controls for controlling playback of the stream of media content using the media device;
   wherein the media application is configured to:
      associate particular operations of one or more playback controls at the headphones or headset device with defined gestures, wherein each defined gesture is associated with a time threshold within which a combination of the playback controls must be applied in order for the gesture to be recognized,
      receive, from the operating system, during playing of an advertisement inserted into the stream for playback at the media device, an indication of an operation of the one or more playback controls at the headphones or headset,
      determine whether the operation of the one or more playback controls at the headphones or headset device, as indicated by the operating system, is:
         (a) a particular defined gesture, as indicated by receipt of the one or more playback controls within the time threshold, and
         (b) received at the media application during a defined time period associated with the playing advertisement,
      if the operation of the one or more playback controls determined to be the particular defined gesture is received at the media application during the defined time period associated with the advertisement playing at the media device, then determining that the operation of the one or more playback controls is indicative of selection of the advertisement, and performing a first functionality associated therewith, and
      otherwise performing a regular functionality associated with the operation of the one or more playback controls.

6. The method of claim 5, wherein the particular defined gesture is a skip action, and the indication of the operation of the one or more playback controls at the headphones or headset device, and associated with the particular defined gesture, is passed by the operating system to the media application, for use by the media application in determining whether the particular defined gesture is received during the defined time period associated with the advertisement playing at the media device.

7. The method of claim 5, wherein the user interface is configured to be locked, and wherein the indication of the operation of the one or more playback controls at the headphones or headset device, and associated with the particular defined gesture, is communicated from the operating system to the media application while the user interface is locked.

8. The method of claim 5, whereupon determining that the operation of the one or more playback controls is indicative of selection of the advertisement, the media application causes an indication of a media content that is associated with the advertisement to be placed in a queue data structure at the media application, for playback at the media device.

9. A non-transitory computer readable storage medium, including instructions stored thereon which when read and executed by one or more computers cause the one or more computers to perform the steps comprising:
providing, at a media device having a processor, operating system, and user interface, a media application that enables playback of a stream of media content at the media device;
wherein the media device operates with a headphones or headset device having playback controls for controlling playback of the stream of media content using the media device;
wherein the media application is configured to:
associate particular operations of one or more playback controls at the headphones or headset device with defined gestures, wherein each defined gesture is associated with a time threshold within which a combination of the playback controls must be applied in order for the gesture to be recognized,
receive, from the operating system, during playing of an advertisement inserted into the stream for playback at the media device, an indication of an operation of the one or more playback controls at the headphones or headset device,
determine whether the operation of the one or more playback controls at the headphones or headset device, as indicated by the operating system, is:
(a) a particular defined gesture, as indicated by receipt of the one or more playback controls within the time threshold, and
(b) received at the media application during a defined time period associated with the playing advertisement,
if the operation of the one or more playback controls determined to be the particular defined gesture is received at the media application during the defined time period associated with the advertisement playing at the media device, then determining that the operation of the one or more playback controls is indicative of selection of the advertisement, and performing a first functionality associated therewith, and
otherwise performing a regular functionality associated with the operation of the one or more playback controls.

10. The non-transitory computer readable storage medium of claim 9, wherein the particular defined gesture is a skip action, and the indication of the operation of the one or more playback controls at the headphones or headset device, and associated with the particular defined gesture, is passed by the operating system to the media application, for use by the media application in determining whether the particular defined gesture is received during the defined time period associated with the advertisement playing at the media device.

11. The non-transitory computer readable storage medium of claim 9, wherein the user interface is configured to be locked, and wherein the indication of the operation of the one or more playback controls at the headphones or headset device, and associated with the particular defined gesture, is communicated from the operating system to the media application while the user interface is locked.

12. The non-transitory computer readable storage medium of claim 9, whereupon determining that the operation of the one or more playback controls is indicative of selection of the advertisement, the media application causes an indication of a media content that is associated with the advertisement to be placed in a queue data structure at the media application, for playback at the media device.

13. The system of claim 1, wherein the media application is configured to recognize a plurality of volume change states.

14. The system of claim 1, wherein the media application is configured to receive, from the operating system, indications of a combination of operations of the one or more playback controls at the headphones or headset device.

15. The system of claim 14, wherein a plurality of time thresholds are defined for use by the media application in determining whether to determine that the combination of operations of the one or more playback controls at the headphones or headset device, is indicative of selection of the advertisement.

16. The system of claim 15, wherein the plurality of time thresholds comprises a clear threshold, which is a period of time before the media application monitors for the combination of operations of the one or more playback controls at the headphones or headset device.

17. The system of claim 1, wherein the first functionality associated with the operation of the one or more playback controls comprises one or more of providing access to a new playlist or sending an email.

* * * * *